United States Patent
Lavasani et al.

(10) Patent No.: US 10,691,797 B2
(45) Date of Patent: Jun. 23, 2020

(54) SYSTEMS AND METHODS FOR COMPILER GUIDED SECURE RESOURCE SHARING

(71) Applicant: BigStream Solutions, Inc., Mountain View, CA (US)

(72) Inventors: Maysam Lavasani, Cupertino, CA (US); Balavinayagam Samynathan, Mountain View, CA (US)

(73) Assignee: Big Stream Solutions, Inc., Mountain View, CA (US)

( * ) Notice: Subject to any disclaimer, the term of this patent is extended or adjusted under 35 U.S.C. 154(b) by 452 days.

(21) Appl. No.: 15/493,878

(22) Filed: Apr. 21, 2017

(65) Prior Publication Data

US 2017/0308697 A1    Oct. 26, 2017

Related U.S. Application Data

(60) Provisional application No. 62/325,938, filed on Apr. 21, 2016.

(51) Int. Cl.
*G06F 21/55* (2013.01)
*G06F 13/20* (2006.01)

(52) U.S. Cl.
CPC ............ *G06F 21/556* (2013.01); *G06F 13/20* (2013.01)

(58) Field of Classification Search
CPC ... G06F 8/40; G06F 8/41; G06F 13/12; G06F 13/122; G06F 13/14; G06F 13/20; G06F 13/4004; G06F 13/4027; G06F 13/4031; G06F 13/4054; G06F 21/55; G06F 21/556
See application file for complete search history.

(56) References Cited

U.S. PATENT DOCUMENTS

| | | | |
|---|---|---|---|
| 2004/0054914 A1* | 3/2004 | Sullivan | G06F 21/602 713/189 |
| 2008/0016288 A1* | 1/2008 | Gaither | G06F 12/0842 711/148 |
| 2008/0072323 A1* | 3/2008 | Yu | G06F 21/556 726/22 |
| 2009/0287734 A1* | 11/2009 | Borders | G06F 21/552 |
| 2011/0099642 A1* | 4/2011 | McDermott | G06F 21/556 726/28 |
| 2014/0254797 A1* | 9/2014 | Piotrowska | H04L 63/0428 380/255 |

(Continued)

OTHER PUBLICATIONS

Hu, Wei-Ming. "Reducing Timing Channels with Fuzzy Time". Proceedings of the 1991 IEEE Computer Society Symposium on Research in Security and Privacy. May 20-22, 1991. IEEE. pp. 8-20. (Year: 1991).*

(Continued)

*Primary Examiner* — Thomas J. Cleary
(74) *Attorney, Agent, or Firm* — Jaffery Watson Mendonsa & Hamilton LLP

(57) ABSTRACT

A data processing system is disclosed that includes an Input/output (I/O) interface to receive incoming data and an in-line accelerator coupled to the I/O interface. The in-line accelerator is configured to receive the incoming data from the I/O interface and to automatically remove all timing channels that potentially form through any shared resources. A generic technique of the present design avoids timing channels between different types of resources. A compiler is enabled to automatically apply this generic pattern to secure shared resources.

13 Claims, 17 Drawing Sheets

(56) References Cited

U.S. PATENT DOCUMENTS

| | | | |
|---|---|---|---|
| 2014/0259161 A1* | 9/2014 | Kastner | G06F 21/556 |
| | | | 726/22 |
| 2016/0170889 A1* | 6/2016 | Lee | G06F 12/0862 |
| | | | 711/118 |
| 2016/0182393 A1* | 6/2016 | Chen | H04L 47/625 |
| | | | 370/412 |
| 2017/0154181 A1* | 6/2017 | Venkataramani | G06F 21/556 |
| 2017/0213028 A1* | 7/2017 | Chen | G06F 9/45558 |
| 2017/0308697 A1* | 10/2017 | Lavasani | G06F 13/20 |

OTHER PUBLICATIONS

Askarov, Aslan, et al. "Predictive Black-Box Mitigation of Timing Channels". CCS '10 Proceedings of the 17th ACM conference on Computer and communications security. Oct. 4-8, 2010. ACM. (Year: 2010).*

Carloni et al., "Theory of Latency-Insensitive Design", IEEE Transactions on Computer-Aided Design of Integrated Circuits and Systems, vol. 20, No. 9, Sep. 2001, 18 pages.

Ferraiuolo et al., "Lattice Priority Scheduling: Low-Overhead Timing-Channel Protection for a Shared Memory Controller", 2016 IEEE, 9787-1-4673-9211-2/16, 12 pages.

Gundu, et al., "Memory Bandwidth Reservation in the Cloud to Avoid Information Leakage in the Memory Controller", HASP'14, Jun. 15, 2014, Minneapolis, MN, USA,ACM 978-1-4503-2777-0/14/06, 5 pages.

* cited by examiner

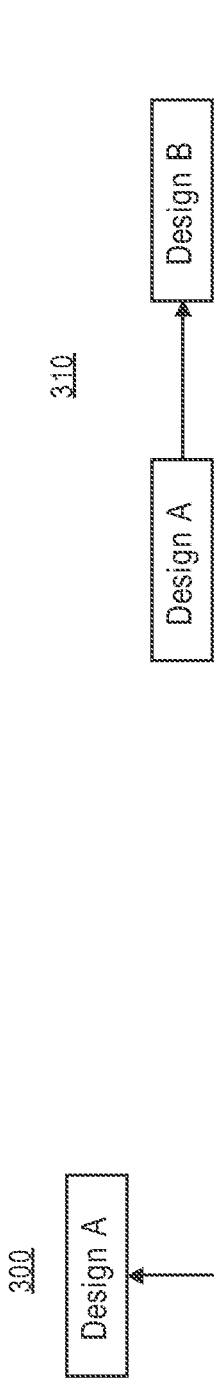
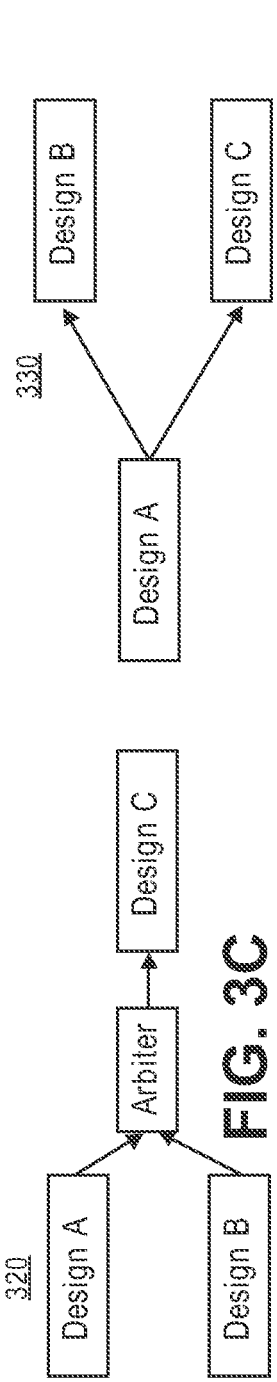
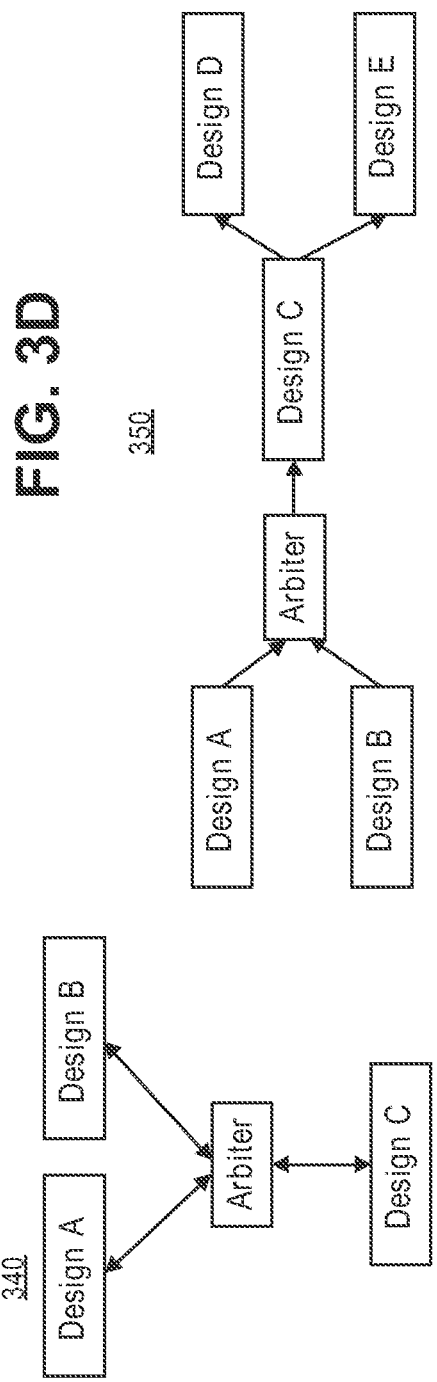
FIG. 3A
FIG. 3B
FIG. 3C
FIG. 3D
FIG. 3E
FIG. 3F

SYSTEMS AND METHODS FOR COMPILER GUIDED SECURE RESOURCE SHARING

RELATED APPLICATIONS

This application claims the benefit of U.S. Provisional Application No. 62/325,938, filed on Apr. 21, 2016, entitled Systems and Methods for Compiler Guided Secure Resource Sharing, the entire contents of which are hereby incorporated by reference.

This application is related to U.S. Non-Provisional application Ser. No. 15/215,374, filed on Jul. 20, 2016, entitled Systems and Methods for In-Line Stream Processing of Distributed Dataflow Based Computations, the entire contents of which are hereby incorporated by reference.

TECHNICAL FIELD

Embodiments described herein generally relate to the field of data processing, and more particularly relate to Systems and methods for compiler guided secure resource sharing.

BACKGROUND

Secure resource sharing in the context of memory controllers have been reviewed in prior approaches. The first approach discusses temporal partitioning in which a specified amount of cycles is allocated to each resource, while a second approach discusses a different type of bandwidth reservation specific to memory read requests. Another approach discusses timing channels in the context of system bus protocols. These approaches are tied to memory controller interfaces and bus protocols.

Presence of hardware Trojan in third party design IPs have been looked at by prior approaches in which HLS and concurrent error detection techniques have been used to detect and recover from the presence of malicious hardware IPs. However these approaches do not consider timing channel attacks by such IPs, nor are their designs accelerator oriented.

Certain approaches discuss providing orthogonal security using FPGAs. In these approaches, FPGAs are considered as trusted computing modules, performing secure operations after decryption and relaying the results of operation after encryption. In this usage model, a third party user cannot directly interact with FPGAs nor detect application being processed upon.

An alternate paradigm to latency insensitive design methodology includes side-channel secure cryptographic accelerators using a GALS methodology. This approach makes use of random clock frequencies for their local synchronous designs in order to obfuscate the power signatures of the design. Also in their approach the accelerator is not shared with other users. Power channel attacks for reconfigurable logic has been reviewed by prior approaches as well.

BRIEF DESCRIPTION OF THE DRAWINGS

FIGS. 3a-3f illustrate Chain relations in accordance with one embodiment.

DESCRIPTION OF EMBODIMENTS

Figure 1:
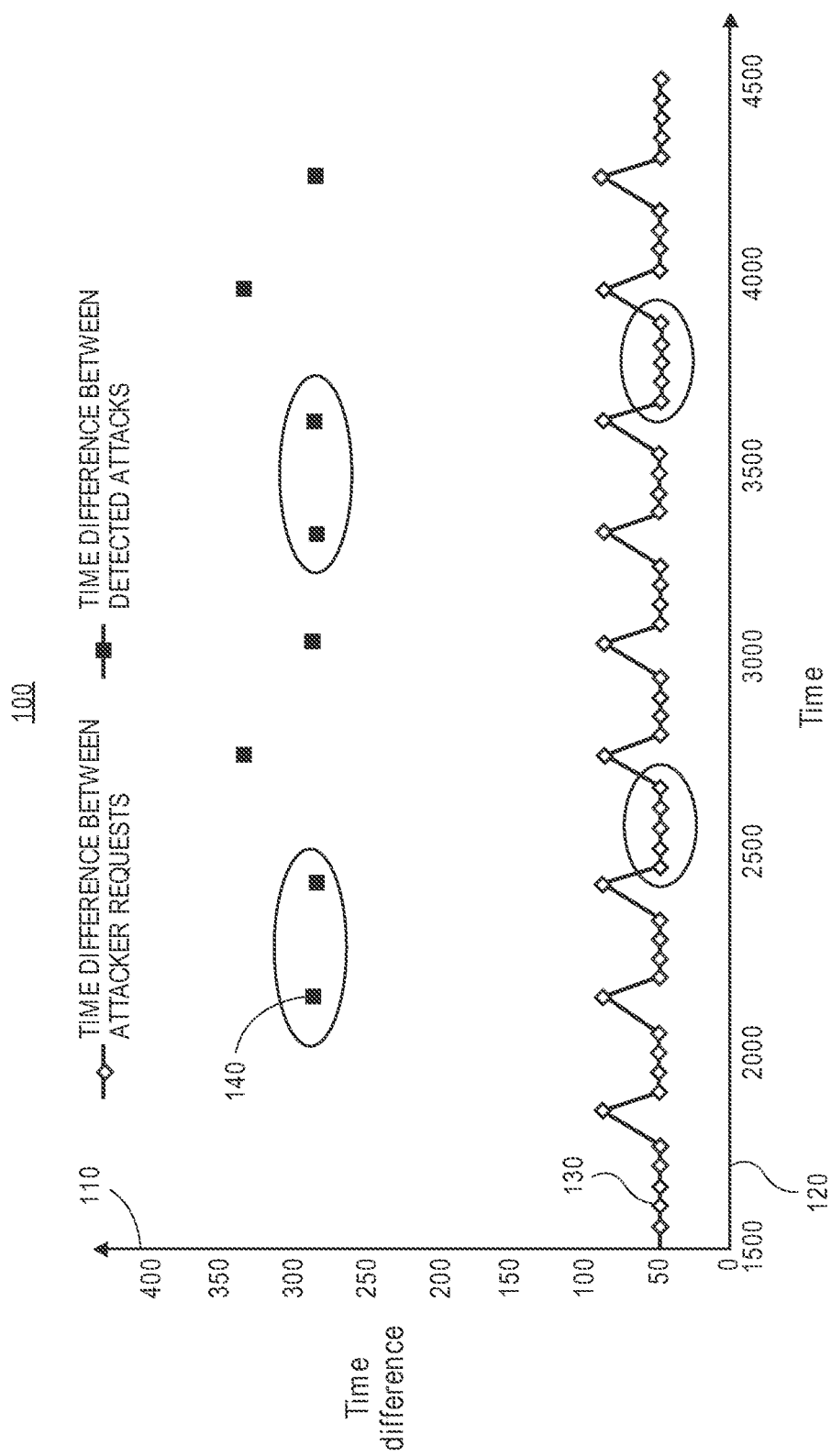
FIG. 1 is a differential timing pattern observed by the attacker in accordance with one embodiment.

Accelerators are becoming more main-stream in modern data centers, with prior approaches exploring architectures, where FPGAs are shared between cloud users as compute resources. Under such a multi-tenant environment, FPGAs provide more options for resource sharing, than traditional servers, as users can share design IPs which can potentially be provided by third party vendors. In this rapidly evolving ecosystem of accelerators, it is critical to assess the security aspects associated with resource sharing. In traditional servers, despite hypervisor security mechanisms, co-location based timing attacks have been shown to be effective in a multi-tenant environment. Accelerators are more vulnerable as they do not have a hypervisor layer and in this patent application, the present design addresses such timing channel attacks.

Since using accelerators has become a mainstream in multi-tenant environments, the problem of leaking information from one tenant to another has become extremely important. One of the important types of information leak can occur through timing channels. In cryptography a timing attack is a side channel attack in which the attacker attempts to compromise a cryptosystem by analyzing the time taken to execute cryptographic algorithms Reviewing a design to make sure that there is no timing channel in it is a tedious process. Previous approaches are not generic for accelerators and are not interface agnostic. These previous approaches are also not compiler-based. When sharing resources, users are not oblivious to the possible information flow that might get formed through timing channels associated with sharing of resources. These shortcomings are addressed in the present design.

In a multi-tenant accelerator environment, efficient utilization can only be achieved through sharing of limited resources. However, sharing resources should not lead to timing channel attacks. Thus, a secure means of design interface protocols needs to be established for resource sharing.

Identifying the trusted computing base (TCB) of a security mechanism is one of the primary steps. Trusted computing base is the total set of hardware and software components that must function correctly in order for security to be maintained. Naturally, it is critical to maintain a minimal TCB. In conventional accelerators, all programs, along with the hardware, is part of trusted computing base. However, programs or IPs, written by third party developers or malicious insiders, can leak information. Hence, in the present design, trusted computing base includes only the compiler and compiler-generated hardware.

This design includes a threat model that considers timing attacks as possible between any two different users controlling any number of modules.

One of the major goals of security in a data-center environment is orthogonal security, which is persistent security mechanisms provided without user being able to detect or interact with security mechanism. The present design addresses orthogonal and oblivious means of achieving security through a compiler.

The present design includes generic bandwidth reservation technique based on latency insensitive design, a methodology for interface agnostic and orthogonal timing channel security for shared resources, and implementation of above methodology for cryptographic and analytic applications. A compiler based solution automatically ensures no timing channel on all shared resources.

In RSA, decryption is done through modular exponentiation of encrypted text as shown in Eqn. 1 where 'n' is the product of two large prime numbers from which public and private keys are derived.

Equation 1: RSA Decryption Through Modular Exponentiation $encryptedText^{privateKey}$ mod $n$ A common implementation of modular exponentiation involves using left to right binary exponentiation technique, in which, based on a corresponding bit in a private key a square operation and modulo or two square operations and modulo are performed. It has been shown previously in memory controller designs that using a shared cache, the RSA key can be extracted by another attacker core sharing the same cache. In this design, it is possible to exploit RSA vulnerability if a DSP multiplier is shared with an attacker thread in FPGA. Note that DSP resources are scarce in FPGAs and naturally sharing them is a common practice. The victim thread performs RSA decryption in FPGA while using the shared DSP for performing square operation in modular exponentiation. The attacker thread continuously sends dummy numbers to DSP multiplier and measures the response time between successive requests. A round robin arbiter decides which user gets control of the DSP multiplier. In one example, the DSP unit in consideration is non-pipelined with 6 cycle latency.

FIG. 1 is a diagram 100 of a differential timing pattern observed by the attacker. A vertical axis 110 plots a time difference between previous attacks versus a horizontal axis 120 that has units of time in nanoseconds. The solid line 130 in FIG. 1 denotes the response time between attacker's successive requests. The peaks in the response time denote when the shared resource was performing the victim's computation, which implies the number of digits in the prime number key. This by itself is dangerous information as the distribution of prime numbers reduces with more number of digits and it might be possible to scan the number of primes within that range. The discontinuous dots 140, which are above the line 130, denote the time taken between successive peaks in solid line 130. A peak among dots 140 indicates that the previous processed bit had value 1. The peaks among dots 140 are due to timing differences between execution time of the modular exponentiation kernel when processing 0 or 1 bit in private key. As the number of bits in the key increases, this method of detecting the key is scalable as this is a deterministic approach.

Two intuitive approaches to avoid such problems are spatial isolation, in which each user gets their own resource, and temporal partitioning, in which each user accesses the resource for a given period (called turn length in the context of memory controller). First approach has high area overhead, while the latter suffers from detrimental throughput.

Figure 2:
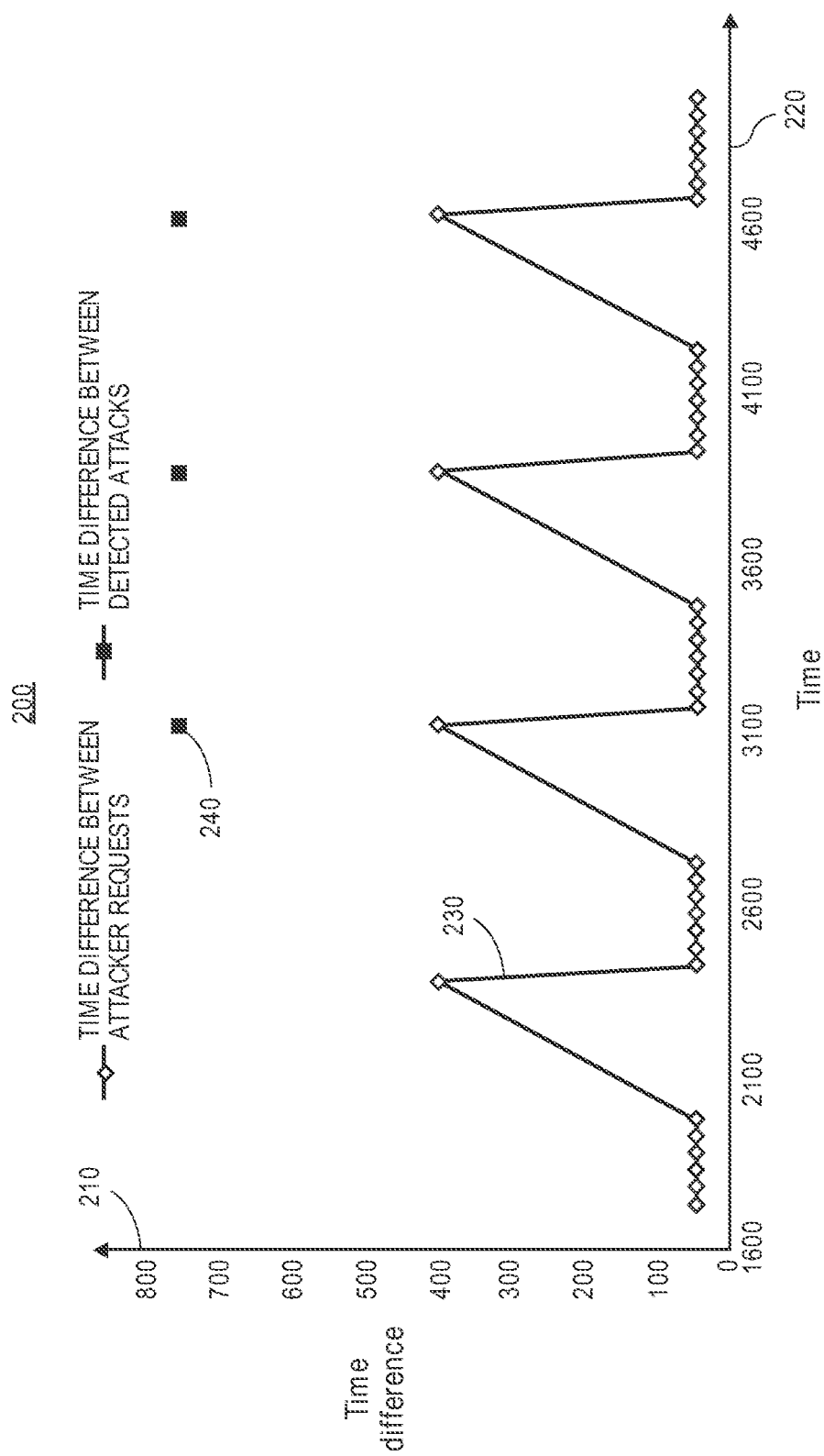
FIG. 2 shows results of differential timing analysis of attacker when temporal partitioning arbiter is used in accordance with one embodiment.

FIG. 2 shows a diagram 200 with results of differential timing analysis of attacker when temporal partitioning arbiter is used. A vertical axis 210 plots a time difference between previous attacks versus a horizontal axis 220 that has units of time in nanoseconds. The dots 240 of peaks here denote turn length given to each resource. Turn length has an inverse effect on performance. The solid line 230 in FIG. 2 denotes the response time between attacker's successive requests.

Malicious insiders can also create covert channels through shared resources to leak information. Attacks similar to one shown above, can be performed with any shared design and hence a generic and efficient solution is needed to address timing channels between any shared resource.

In a latency insensitive design, stallable design modules (e.g., logic, design cores) communicate with each other through interfaces, which are based on a tagged signal model. AMBA R AXI4-Stream is an example of industry standard protocol which uses valid/ready based tags for achieving latency insensitive design interfacing. In a valid/ready based interface the consumer waits for input, that is signaled valid and the producer removes the valid signal when consumer acknowledges through ready. The valid tag handles variable latency of designs, while lack of ready denotes back-pressure from the consumer. In such latency insensitive designs, timing becomes a property of valid/ready. The design includes a technique of bandwidth reservation making use of valid/ready based interfaces between design modules, while relying on a compiler for generating the composition of design modules, so that user is oblivious to timing aspects of design interactions. In such a methodology, the user only describes the computation algorithm or specifies a particular design IP, while the compiler takes care of scheduling and interfacing aspects of the design. This opens up opportunities for providing orthogonal timing security.

The present design chooses an open source version of a high level compiler, which uses valid/ready based interface for interconnecting designs and implemented this technique of the present design. For this compiler, an algorithm is specified through C-styled kernels called engines, while design interconnections are specified in a separate composition code. There are two basic kinds of relations in which designs can be connected with each other through its composition compiler An Offload Relation is defined as a relation where one design behaves similar to a high-level function for other designs. A user thread from other designs can send requests to the offloaded design, but need to stall in the same state until the offloaded design finishes computation and provides a reply.

FIG. 3a illustrates this simple offload architecture 300 along with Scala based DSL code (e.g., val comp=Chain (A, B)) for specifying this relation between design modules A and B in accordance with one embodiment. A chain relation is a relation in which one design module acts as a producer and the other as consumer. This is a one-directional relation, where consumer cannot relay any data back to producer but can stall the producer's thread by refusing to accept input. A simple example of chain relation architecture 310 along with Scala based DSL code (e.g., val comp=Offload (A, B)) for design modules A and B is illustrated in FIG. 3b.

The present design extended the chain relation with fork relation of FIG. 3d and join relation of FIG. 3c. FIG. 3c illustrates a join relation architecture 330 along with Scala based DSL code (e.g., val comp=join (ArrayBuffer (A,B), C)) for specifying this join relation between design modules A, B, and C in accordance with one embodiment. In this example, multiple designs feed to one consumer.

FIG. 3d illustrates a fork relation architecture 330 along with Scala based DSL code (e.g., val comp=fork (A, ArrayBuffer (B, C)) for specifying this fork relation between designs module A, B, and C in accordance with one embodiment. In this example, the design modules A feeds multiple design modules B and C.

These relations are language constructs for interconnecting design modules. The compiler automatically inserts arbiters if there is contention in the interface, as illustrated in FIGS. 3e and 3f for chain and offload relations respectively. Thus, it is compiler's responsibility to generate correct interconnections for any type of relations specified using such language constructs.

FIG. 3e illustrates an offload relation architecture 340 along with Scala based DSL code (e.g., val comp=offload (ArrayBuffer (A,B), C)) for specifying this offload relation between design modules A, B, and C in accordance with one embodiment.

FIG. 3f illustrates a join and fork relation architecture 350 along with Scala based DSL code (e.g., val merged=join (A, ArrayBuffer (A, B), C), val comp=fork (merged, ArrayBuffer (D, E)) for specifying these relations between designs module A, B, C, D, and E in accordance with one embodiment.

Figure 16:
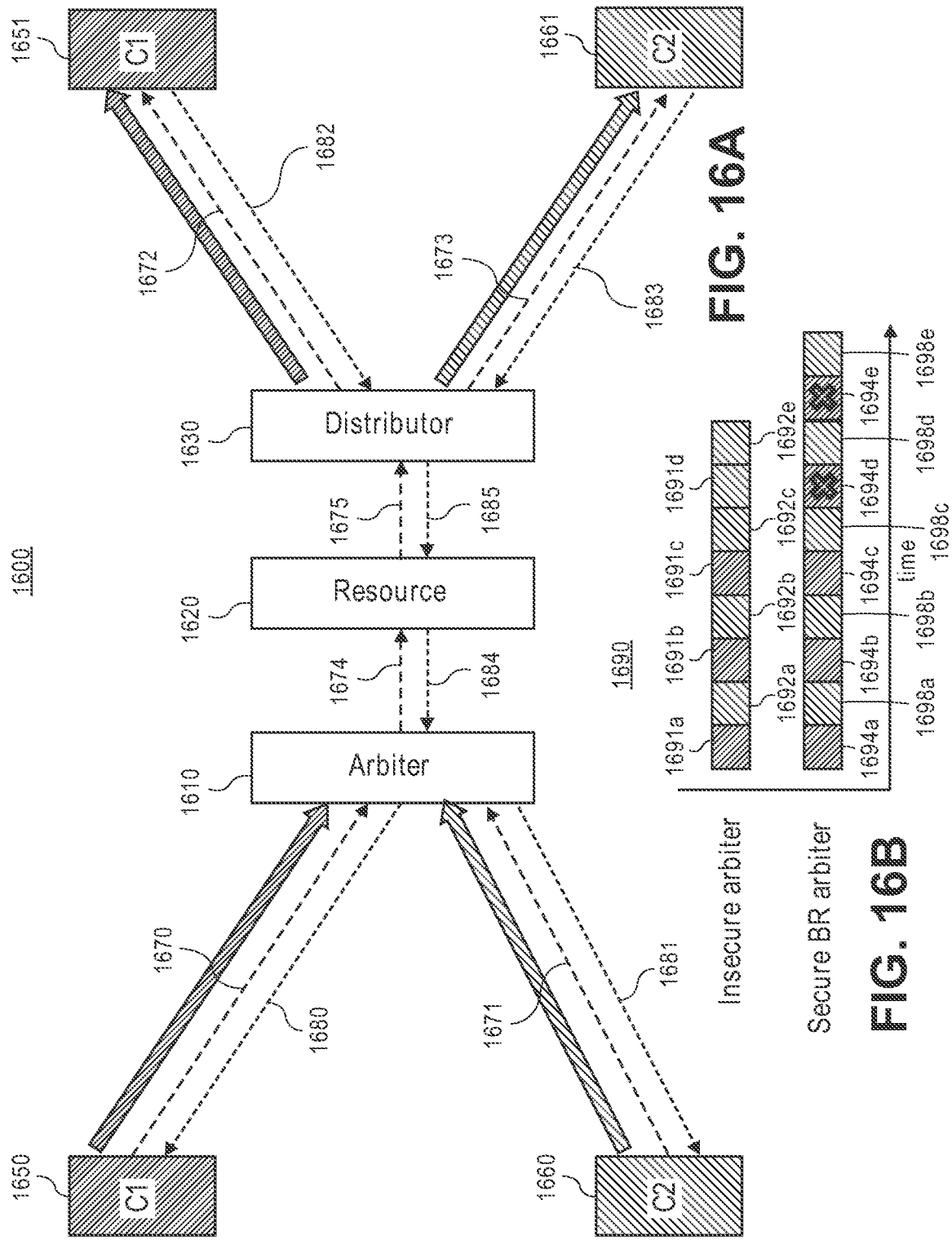
FIGS. 16A-16B illustrate an arbiter interfacing mechanism with resource and bidders.

Arbiters, generated through compiler, have information about contention in that interconnect, and hence the present design modified the design of arbiter to provide timing channel guarantees for bidders of each resource as illustrated in architecture 1600 of FIG. 16A. The architecture 1600 includes an arbiter 1610, a resource 1620, and a distributor 1630. Valid communication signals 1670-1675 and ready communication signals 1680-1685 are sent between victims 1650, 1651, attackers 1660, 1661 and the arbiter, resource, and distributor. In order for the arbiter 1610 to uniquely identify the bidders and track interfaces in hardware, each design's interface was modified with the signals thread_id, user_id, valid, and ready.

In one embodiment, a modified arbiter reserves bandwidth for each bidder, irrespective of whether they use the resource in their allocated time or not. The amount of bandwidth allocated for each bidder depends on the input processing latency of the resource. If the resource under contention accepts inputs every 'n' cycles, then arbiter switches bidder for every 'n' cycles thereby allocating 'n' cycles to each bidder. During their allocated bandwidth, the bidder can choose not to use the resource. In memory controller based bandwidth reservation techniques, a dummy memory read is performed when bidder does not use the resource, whereas in our model, read or write is a property of user interface and should not be overridden with a controlled value from another principal or entity. In order to achieve this, arbiter propagates valid signal (e.g., valid signal 1670, 1671) from the bidder, who is chosen, to the resource and applies artificial back-pressure to other bidders through ready signal (e.g., 1680, 1681). This method of bandwidth reservation is generic and can be applied to any resource, irrespective of interface type.

FIG. 16B illustrates a timing diagram 1690 for an insecure arbiter and a secure arbiter in accordance with one embodiment. An insecure arbiter has victim bids 1691 a-c and attacker bids 1692a-e. A secure arbiter has victim bids 1694a-e and attacker bids 1698a-e with victim bids 1694d-e being stalled or eliminated.

Let us consider the example of FIG. 3e where design module C becomes our resource which is shared between victim (design module A) and attacker (design module B). Let us start with the case that resource C accepts inputs every cycle and occupancy delay is 1. Our bandwidth reservation based arbiter is the neutral component interfacing A and B with resource C. A grant register inside the arbiter points to the bidder whose inputs are passed on to the resource.

Figure 4:
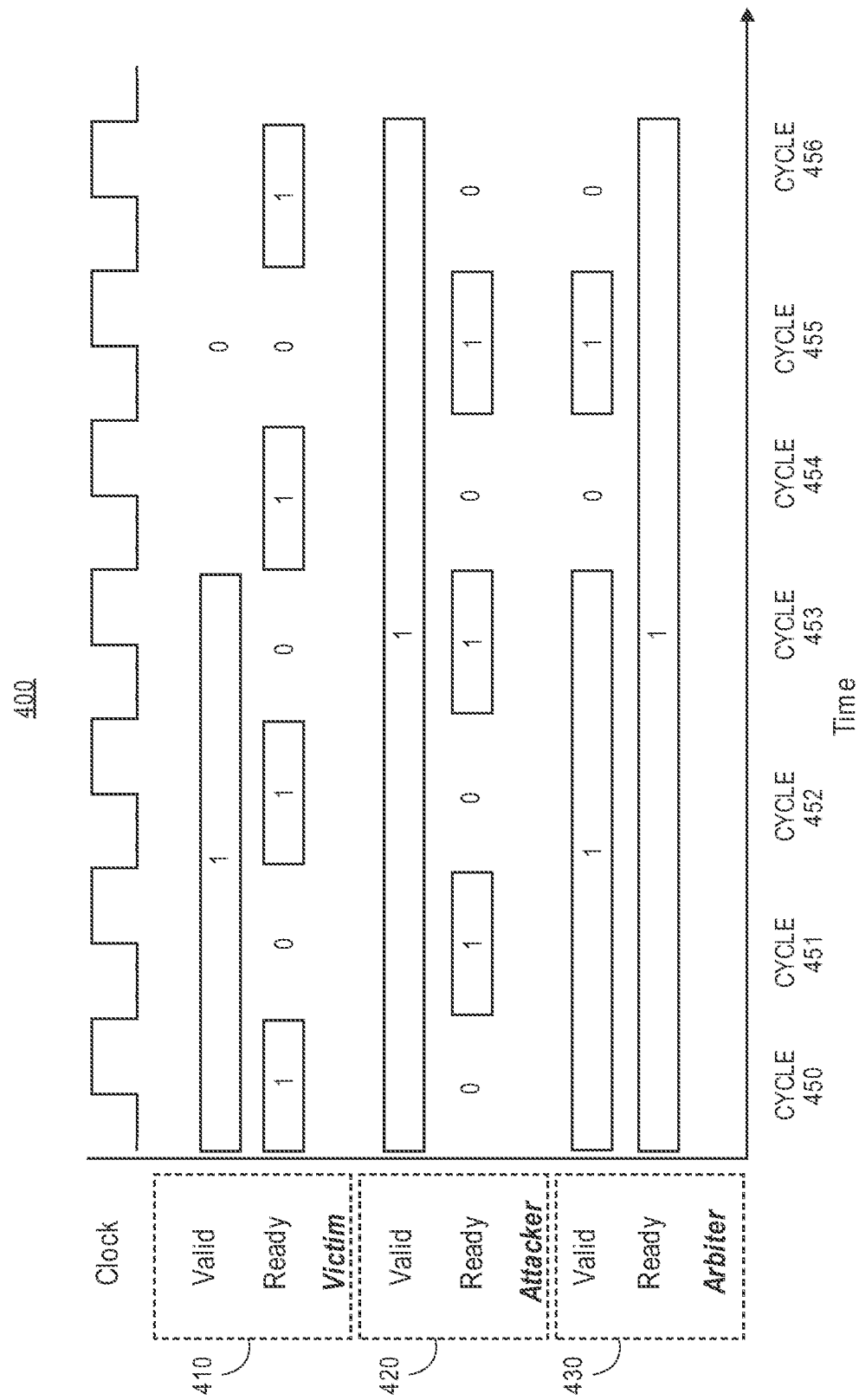
FIG. 4 conveys cycle accurate information of a timing diagram having cycles 450-456 to illustrate how an arbiter works in accordance with one embodiment.

FIG. 4 conveys cycle accurate information of a timing diagram having cycles 450-456 to illustrate how an arbiter works in accordance with one embodiment. Signals marked valid are outputs of that corresponding design (e.g., 410, 420, 430), whereas ready is the input from the module connected to its output. For the victim and attacker, ready signal is provided by arbiter, whereas valid is passed from victim and attacker to the arbiter.

In this example, at first cycle 450, both victim and attacker request for the resource through valid. Since grant register points to victim, ready is signaled only to victim. In the next cycle 451 grant register points to the attacker and so ready is lowered for victim and raised for attacker and this toggling of ready between bidders repeats continuously. Lowering ready serves to apply back pressure to non chosen bidders. The purpose of connecting bidder's valid signal to the resource's valid comes into picture when the user pointed to by grant register does not need the resource in that cycle, in which case the output valid of arbiter is low as can be seen at cycles 454 and 456 in the FIG. 4.

In the case where the latency between successive inputs is multiple cycles, the present design inserts dead cycles equal to latency of the resource. The present design uses dead cycles in order to prevent the bidder from issuing multiple requests during their bandwidth. If a resource has variable latency between inputs, then the number of dead cycles will be that of maximum latency. A fully pipelined design does not need any dead cycles and hence performance impact of sharing such a resource is minimal.

The present design uses the same modular exponentiation design but used the bandwidth reservation based arbiter.

Figure 5:
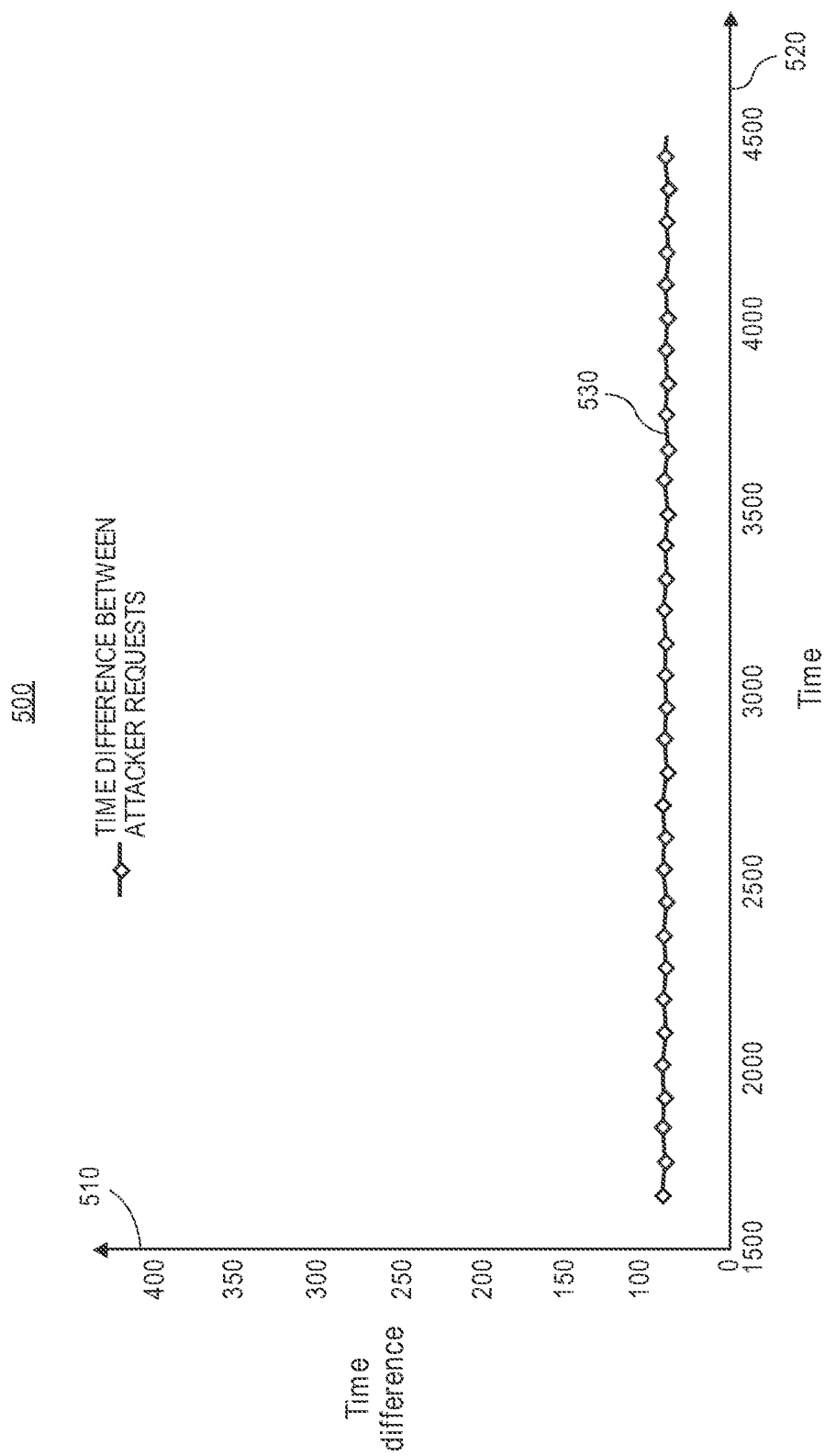
FIG. 5, no timing information is now observable to the attacker in accordance with one embodiment.

As seen in FIG. 5, no timing information is now observable to the attacker when using bandwidth reservation in accordance with one embodiment. A vertical axis 510 plots a time difference between previous attacks versus a horizontal axis 520 that has units of time in nanoseconds. The solid line 530 in FIG. 5 denotes the response time between attacker's successive requests. In contrast to FIGS. 1 and 2, no discontinuous dots or peaks are visible for a time difference between detected attacks.

On the other hand, round-robin based arbiter leaks timing information because it allows attacker requests to access the resource if there is no contention. This exposes a contention based timing channel. The present design closes this channel, by reserving bandwidth for each bidder. It is important to note that under full resource contention, the behavior of both round robin and bandwidth reservation is the same as these techniques both try to enforce fairness.

Figure 6:
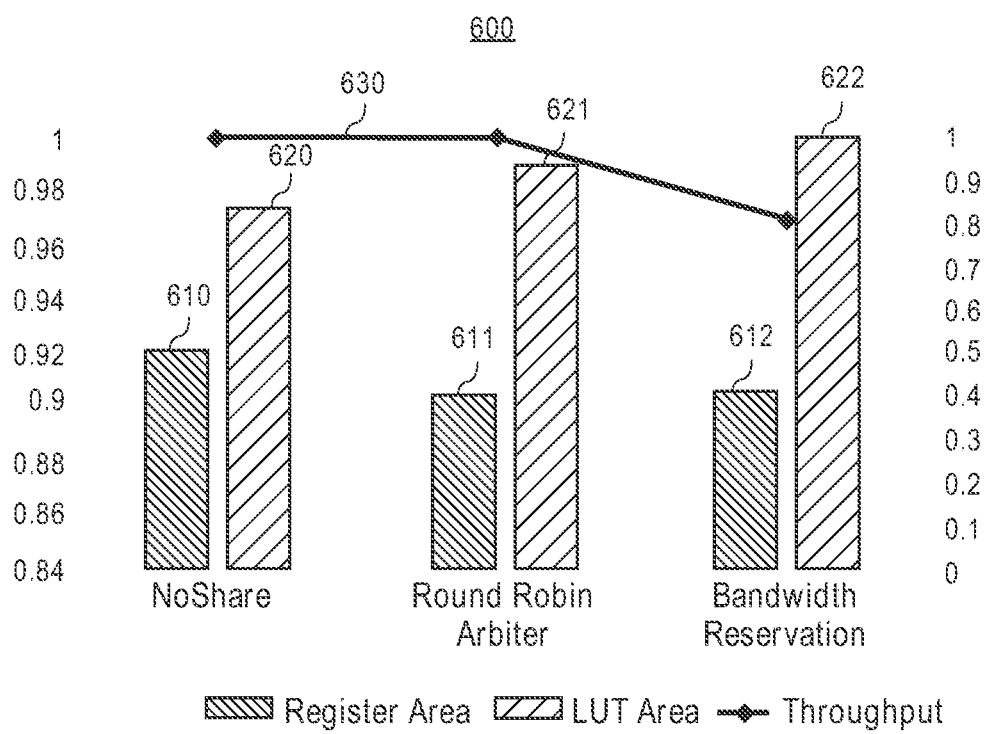
FIG. 6 illustrates a performance-area comparison chart in accordance with one embodiment.

The present design can observe from the performance-area comparison chart 600 in FIG. 6 that performance degradation of modular exponentiation design that is illustrated with throughout 630 is less than 15% while sharing a DSP multiplier when compared to spatial isolation (shown in the first column 610-612). One noticeable and interesting fact in FIG. 6 is that sharing a resource increases LUT area (e.g., 620-622) for this design as this is a register heavy design with small combinational logic and introducing arbiter increases combinational area of the design. A compiler based solution can analyze such trends and make smart choices of whether spatial isolation is better under provided constraints.

AES is a common symmetric key encryption algorithm used in security protocols like IPSec, TLS/SSL, SSH, etc. and is common among cryptographic accelerators. In one example, the present design includes a 128-bit key AES encryption engine through high-level language.

Figure 7:
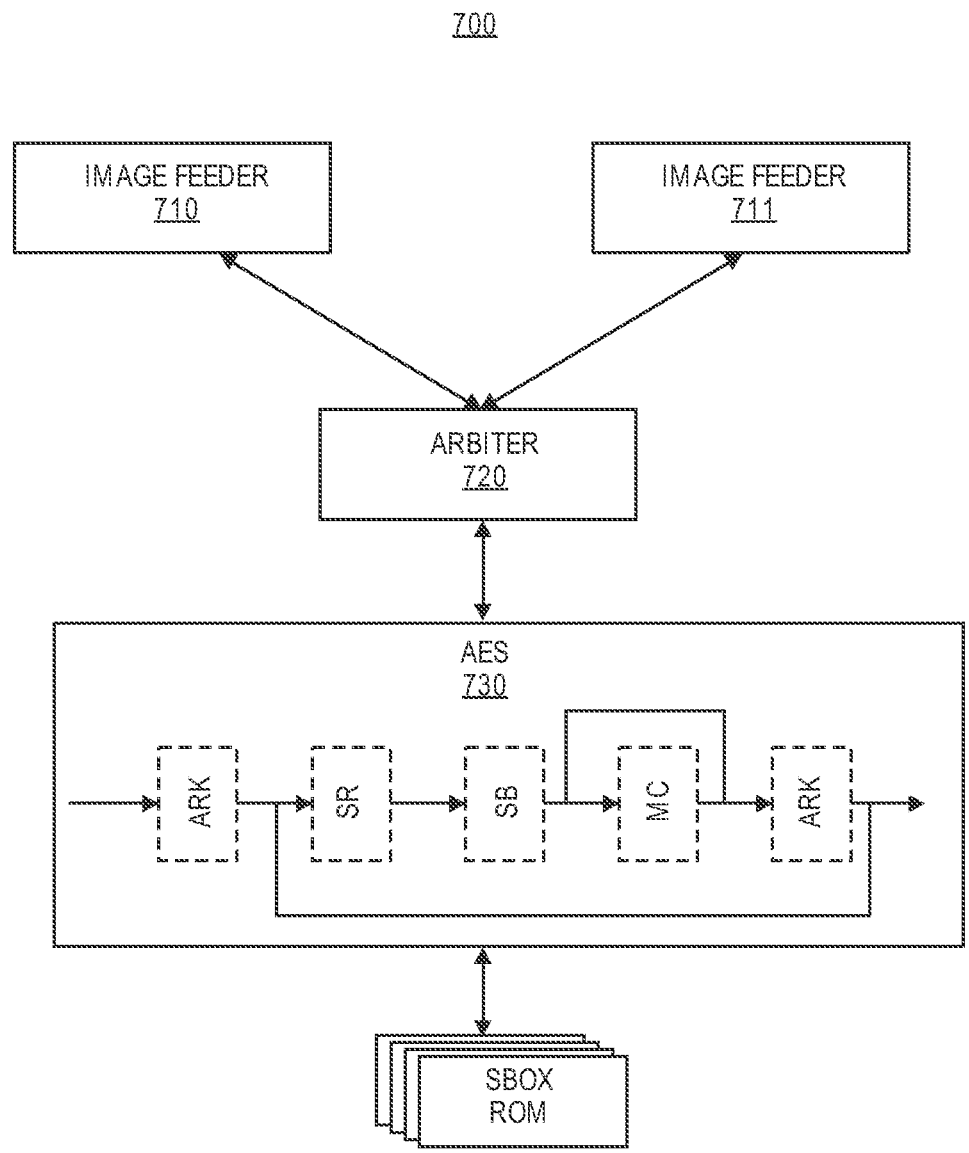
FIG. 7 shows the architecture of AES when it is shared between two engines in accordance with one embodiment.

FIG. 7 shows the architecture 700 of AES when it is shared between two engines (e.g., Configuration similar to 3e, image feeders 710-711), which send blocks of image for encryption to the design 730 via arbiter 720 in accordance with one embodiment. The interface between both the modules is a 128-bit bus for sending plain text and receiving encrypted text back. This design illustrates an example where a design IP is shared between two designs and our bandwidth reservation technique still works according to intent.

Figure 8:
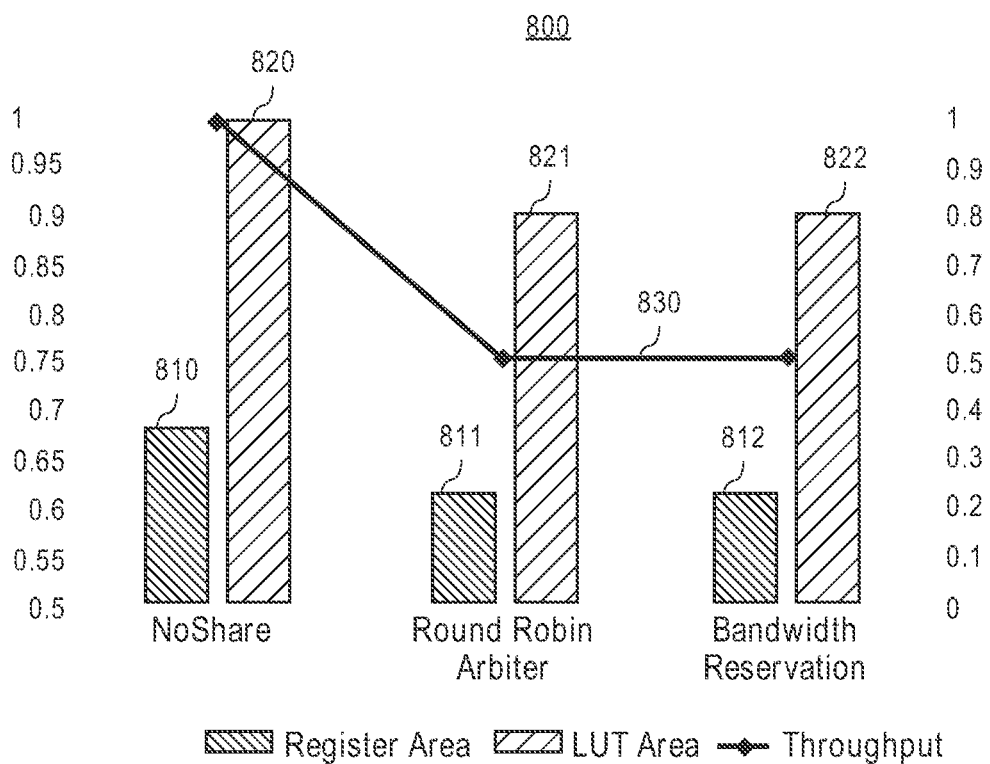
FIG. 8 illustrates a performance impact of sharing this encryption engine in accordance with one embodiment.

As can be observed from a chart 800 illustrated in FIG. 8 in accordance with one embodiment, the performance impact (e.g., throughput 830) of sharing this encryption engine is quite high for round robin arbiter and bandwidth reservation in comparison to no share. Register area 810-812 is illustrated for these techniques and LUT area 820-822 is also illustrated for these techniques. Depending on how frequently the offloaded unit is used, throughput optimizations can give better results.

Figure 9:
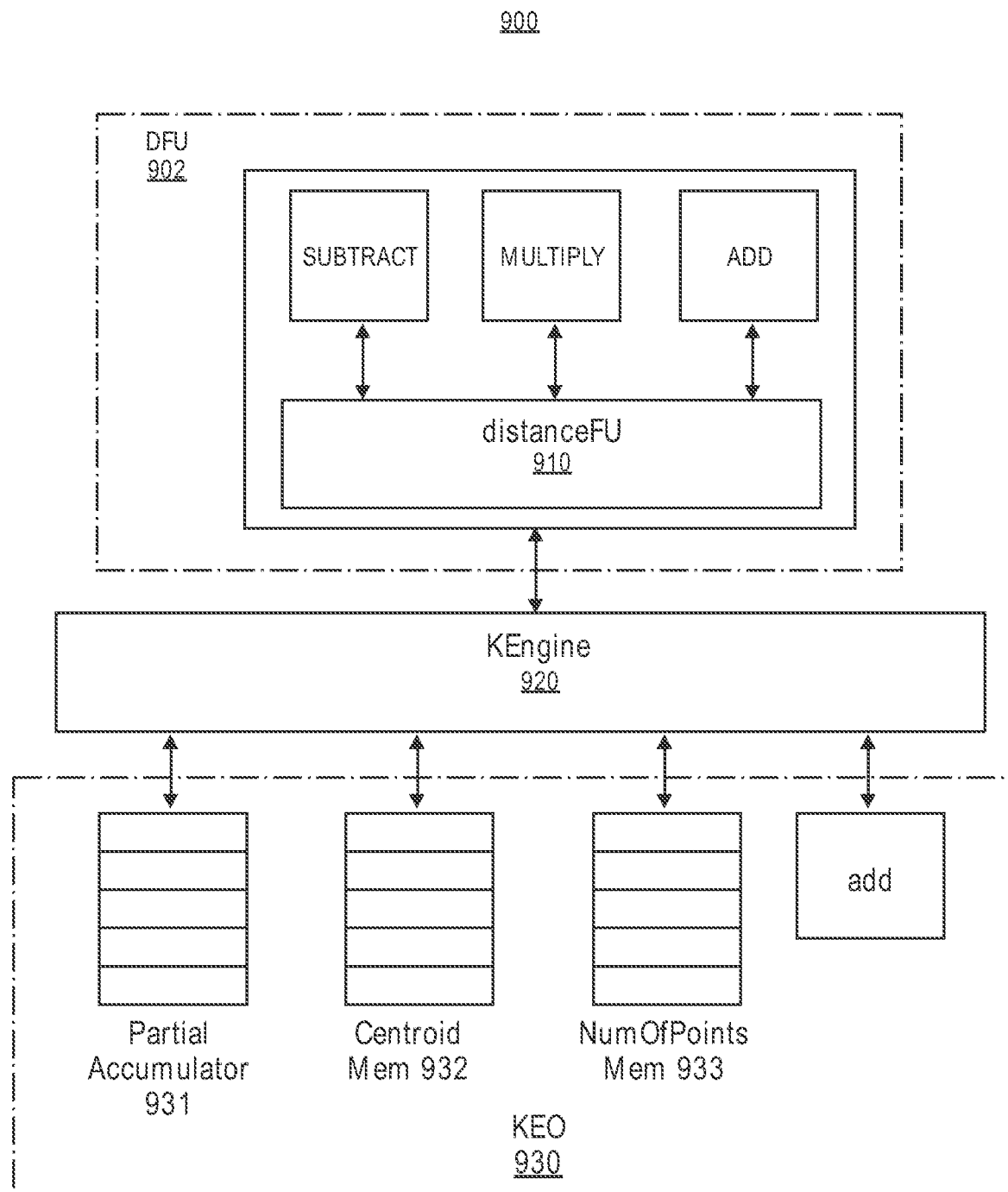
FIG. 9 illustrates an architecture of a single instance of a K-means in accordance with one embodiment.

K-Means clustering is a popular data-mining algorithm where the objective is to find 'K' centroids if we need 'K' clusters among data points. Dedicated FPGA accelerators for K-Means have been explored in prior approaches. In this implementation of the present design, multiple instances of K-means accelerator are created and consider sharing common resources for efficient utilization. The architecture 900 of a single instance of our K-means is shown in FIG. 9 in accordance with one embodiment. In the present design's iterative version of K-Means, points are streamed through accelerator while distance between each centroid and the point is computed. The centroid, with the closest distance, updates its cumulative sum with the new distance. Once all points are streamed through, new centroids are computed. This process is repeated until centroids converge.

The data points used in our case are double precision floating point numbers. In FIG. 9, the distanceFU offload unit 910 of DFU 902 computes Euclidean distance between points. Partial Accumulator 931 is a BRAM memory used to store cumulative sum of distances between each centroid and points in its cluster. Centroid Memory 932 is another small memory which saves centroid locations for each round. NumOfPoints Memory 933 stores number of points in each cluster. The composition code for shared configuration is shown below.

```
...
vat kengine = Engine("KEngine.c")
vat kmWithDist = Offload(kengine, distanceFU) val kmeansAcc =
Offload(kmWithDist, KEO)
vat result = fork(distributer,
ArrayBuffer.fill(NUM_USERS)(kmeansAcc))
```

NUM_USERS specifies number of accelerator instances needed.

A. Shared Memory Units

As number of K-Means instances increase, sharing BRAM units, which are infrequently used increases effective utilization. When BRAM units are shared for different users, our modified compiler creates memory partition for each user. Address translation and bounds checking is performed by the arbiter for each user. If a user tries to access out of his bounds, the address is wrapped around over the users' bounds.

B. Sharing K-Means Offloads

While creating multiple instances of K-Means accelerators, three major configurations of shared offloads is possible. We discuss performance area trade-offs associated with each choice for two instances of K-Means.

KEO Configuration: Two instances of K-Means accelerators share all memory and floating point units (e.g., marked KEO 930 in FIG. 9).

KDistanceFU Configuration: Two instances of KMeans share the distance computing engine along with its offloads (e.g., marked DFU 902 in FIG. 9). Distance computing engine is performance optimized and area heavy design than rest of the offloads.

KEO+KDistanceFU Configuration: All offloads of KEngine (e.g., KEngine 920) are shared between two instances.

Figure 10:
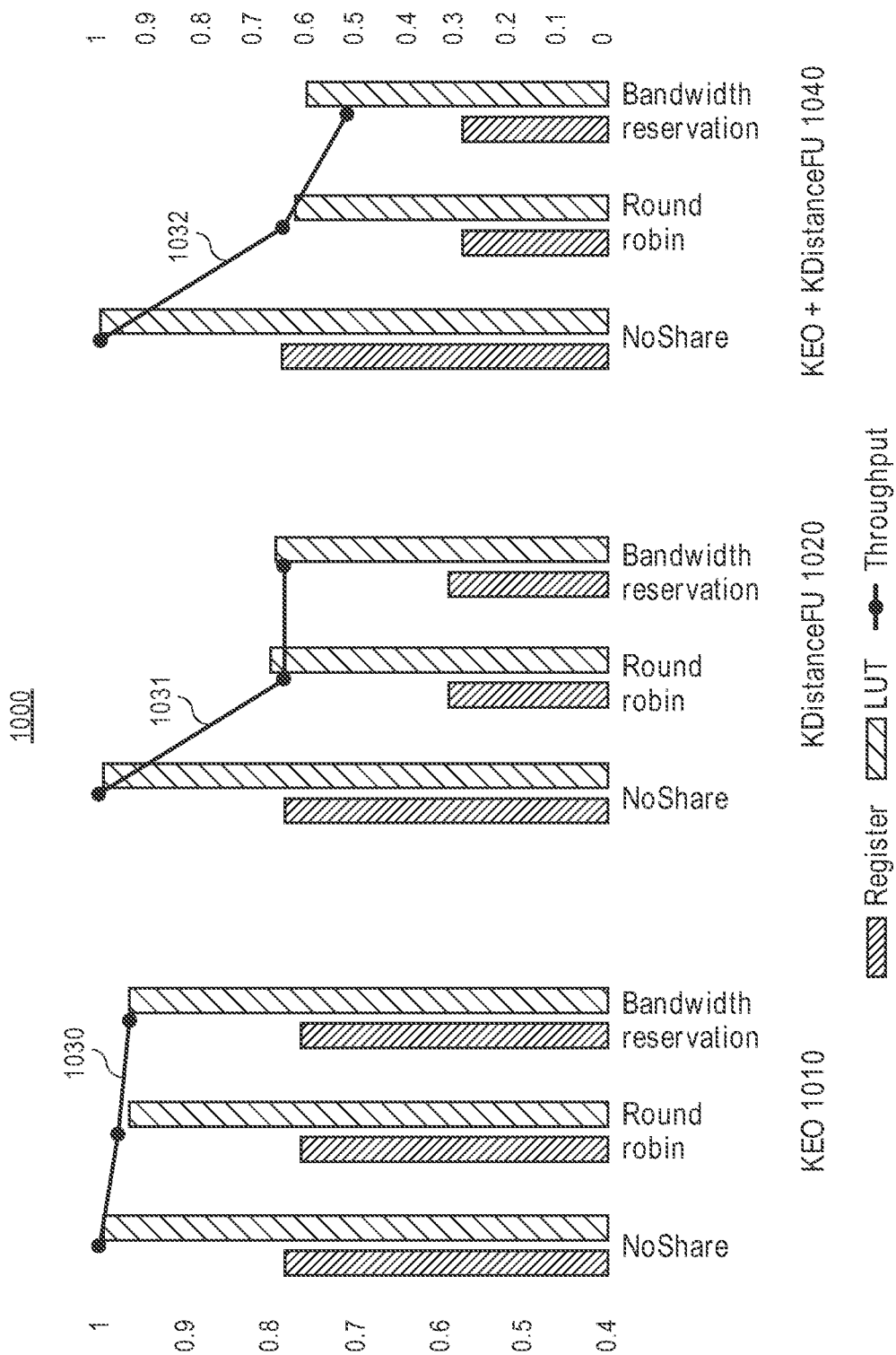
FIG. 10 shows a performance-area comparison between these three approaches in accordance with one embodiment.

FIG. 10 shows a performance-area comparison chart 1000 between these three approaches in accordance with one embodiment. The performance impact (e.g., throughput 1030) of sharing memories and DSP add unit is minimal for KEO 1010 since these operations are fully pipelined. This is not the case with distanceFU unit 1020 and hence performance overhead 1031 in the second configuration is much more. In the third scenario the performance degradation 1032 of bandwidth reserved arbiter drops even lower due to consistent loss of synchronization between reading from memory and computing distance.

The bandwidth reservation technique discussed herein does not apply, if the shared resource is connected in chain configuration with attacker and victim. An example of such a chain configuration, by using fork and join constructs, is shown in FIG. 3f. In this scenario, design 'A' and 'D' form the attacker, while 'B' and 'E' form the victim designs. The arbiter, inserted automatically through the compiler, is connected between attacker and victim. Design 'C' is the resource under contention and distributes the result to either 'D' or 'E' based on user id. In this scenario, the attacker at the end of chain can stall the modules as ready propagates backward, while valid travels forward.

Figure 11:
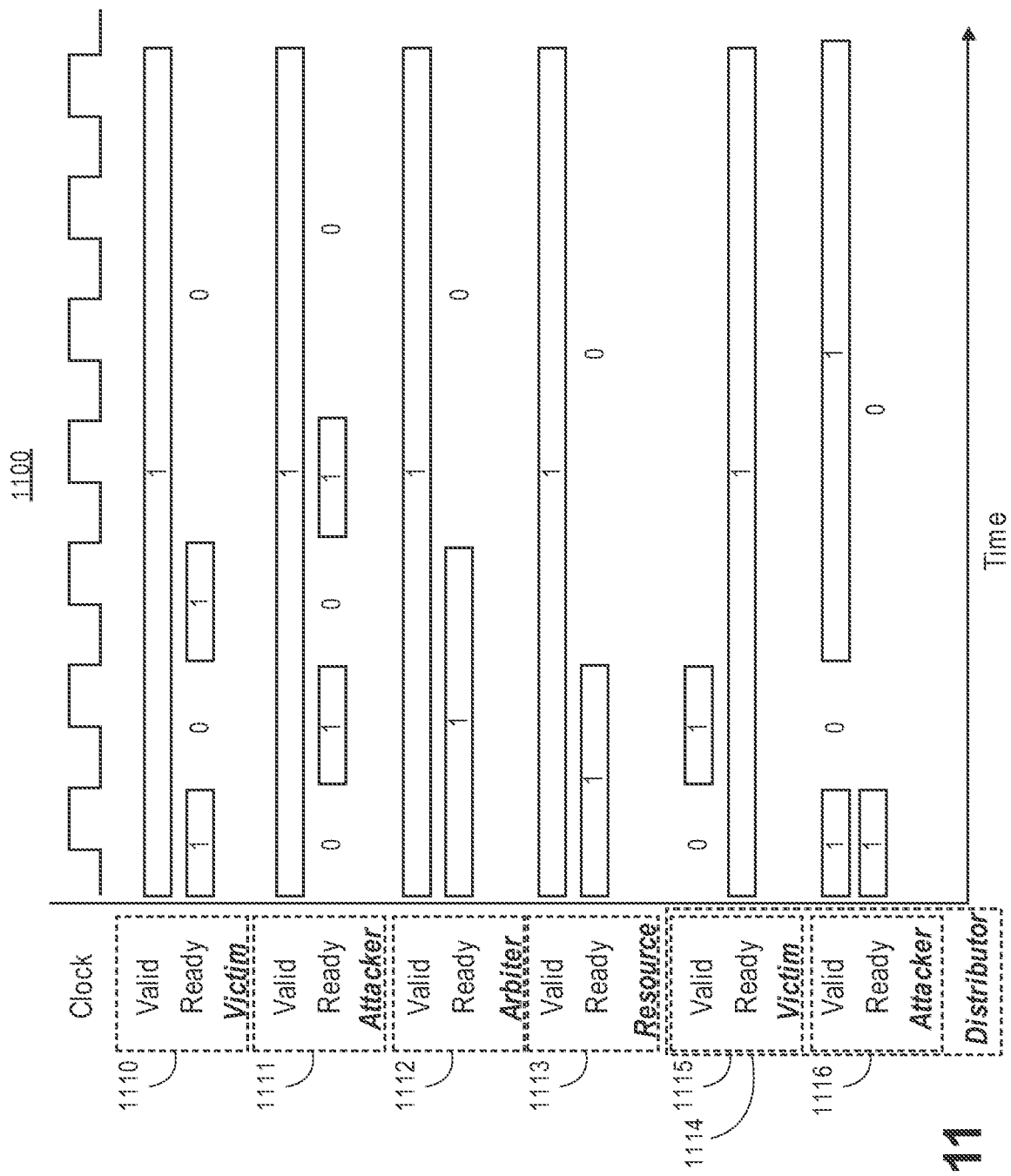
FIG. 11 illustrates how ready from attacker propagates backwards through the chain to stall the arbiter in accordance with one embodiment.

FIG. 11 illustrates timing information with timing diagram 1100 to show how ready from attacker propagates backwards through the chain to stall the arbiter in accordance with one embodiment. Thus, in a chain relationship attacker can throttle the resource bandwidth, thereby creating a timing channel Signals marked valid are outputs of that corresponding design (e.g., 1110-1116), whereas ready is the input from the module connected to its output. For the victim and attacker, ready signal is provided by arbiter, whereas valid is passed from victim and attacker to the arbiter.

A compiler can analyze performance and area objectives of a design and choose the preferred method among spatial isolation and bandwidth reservation for achieving security. A composition compiler of the present design explores design points and creates a performance area model in order to find the Pareto-optimal choice for this 2-objective problem. A linear model reduces number of synthesis runs required for full design space exploration and chooses a preferred solution.

In one example, both area and performance objectives are scalarized into one utility function.

$a_\pi$ and $t_\pi$ represent area and effective latency (inverse of throughput) of the baseline design while, $a_\lambda$ and $t_\lambda$ represent area and effective latency of the design being explored. The smaller the values of $a_\lambda$, $t_\lambda$ and $\delta$, the better the design. $\alpha$ and $\beta$ are weightage associated with area and performance objects that user can specify.

Utility Function for Integrating Performance Area Objecives     Equation 2

$$\delta = \max\left\{0, \frac{\alpha(a_\lambda - a_\pi)}{a_\pi}\right\} + \max\left\{0, \frac{\beta(t_\lambda - t_\pi)}{t_\pi}\right\}$$

Figure 12C:
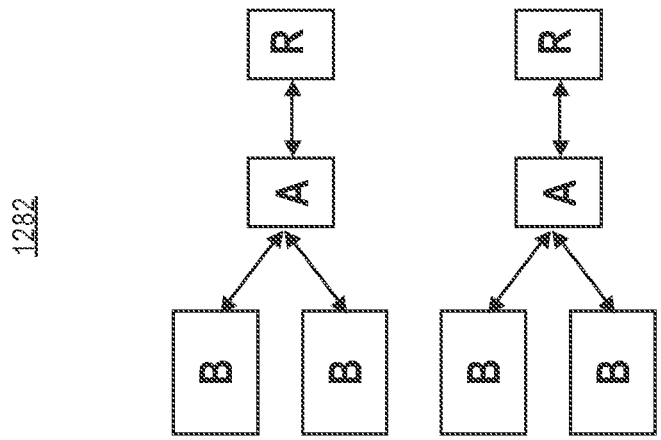
FIGS. 12a-12c illustrate a design space of D designs in accordance with one embodiment
Figure 12B:
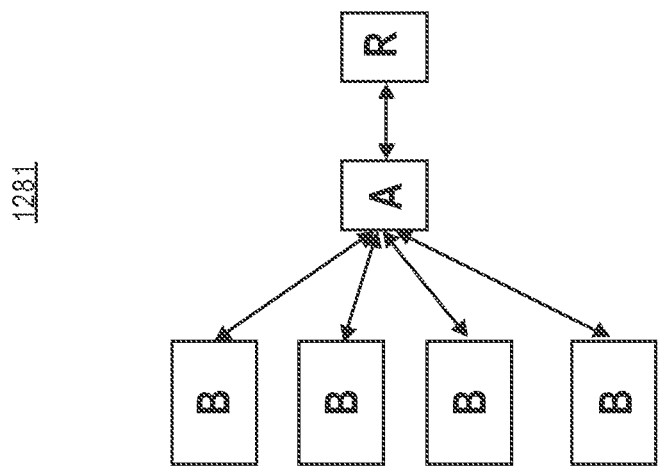
Figure 12A:
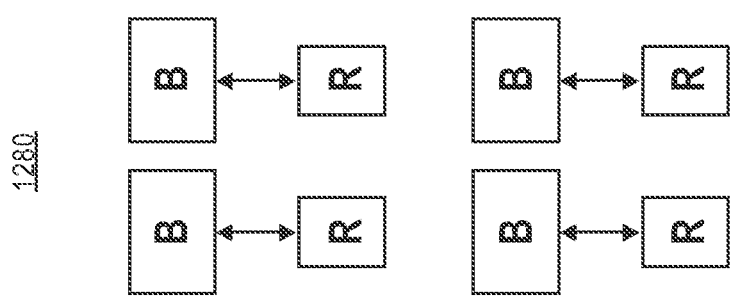

For a design that chooses spatial isolation for N number of bidders, the utility function ($\delta_{NS}$) is given by Eqn. 3. With spatial isolation, the present design does not sacrifice performance, but area increases linearly with number of bidders. On the other hand, Eqn 4 represents utility ($\delta_s$) of a shared design, where latency increases with number of bidders. $a_{arb}$ represents the area of arbiter inserted that increases with number of bidders. In another example, the present design could also have a hybrid solution, where k groups among N bidders share the resource and this is represented by Eqn. 5. The design space (e.g., 1280, 1281, 1282) of D designs is represented by FIGS. 12a-c, where Eqn 3, 4 and 5 are represented by FIGS. 12a,b and c respectively with N=2 and k=2.

Utility Function for Non-Shared Resources     Equation 3

$$\delta_{NS} = \frac{\alpha(Na_\lambda - a_\pi)}{a_\pi} + \frac{\beta(t_\lambda - t_\pi)}{t_\pi}$$

Utility Function for Shared Resources     Equation 4

$$\delta_S = \frac{\alpha((a_\lambda + Na_{arb_2}) - a_\pi)}{a_\pi} + \frac{\beta(Nt_\lambda - t_\pi)}{t_\pi}$$

Utility Function for Hybrid Resources     Equation 5

$$\delta_H = \frac{\alpha\left(ka_\lambda + ka_{arb_1} + \frac{N}{k}a_{arb_2} - a_\pi\right)}{a_\pi} + \frac{\beta\left(\left(\frac{N}{k}t_\lambda\right) - t_\pi\right)}{t_\pi}$$

For this, a synthetic experiment in which three designs of increasing area and DSP usage are shared with different number of users is performed. In prior approaches involving shared FPGAs, the number of users is below 4. The present design considers up to 8 users for a given design and illustrates how a compiler can choose between generating spatially isolated resource for each user or share the resource with different users based on area throughput trade-offs.

Figure 13:
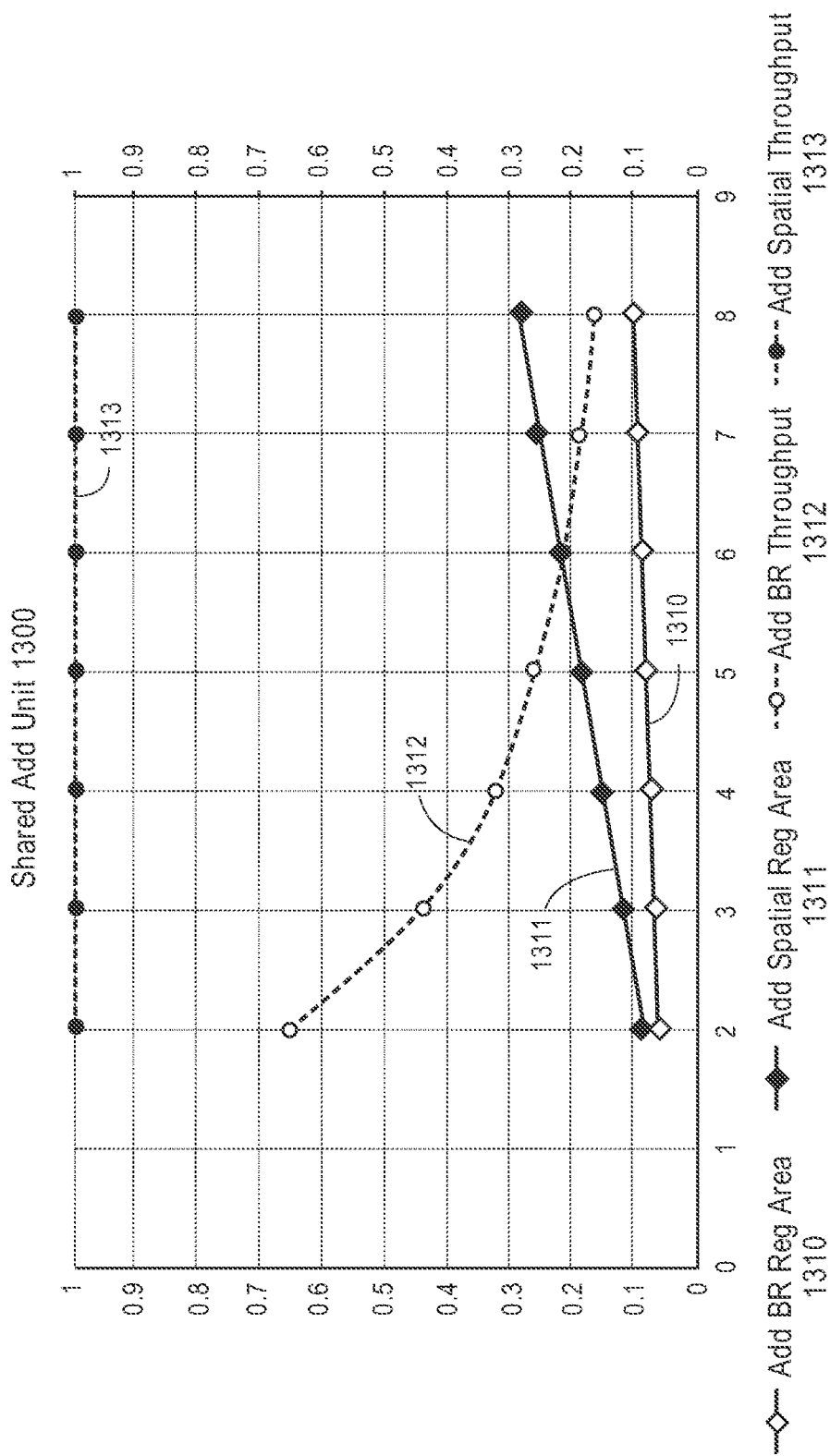
FIG. 13 illustrates a shared add unit in accordance with one embodiment.
Figure 14:
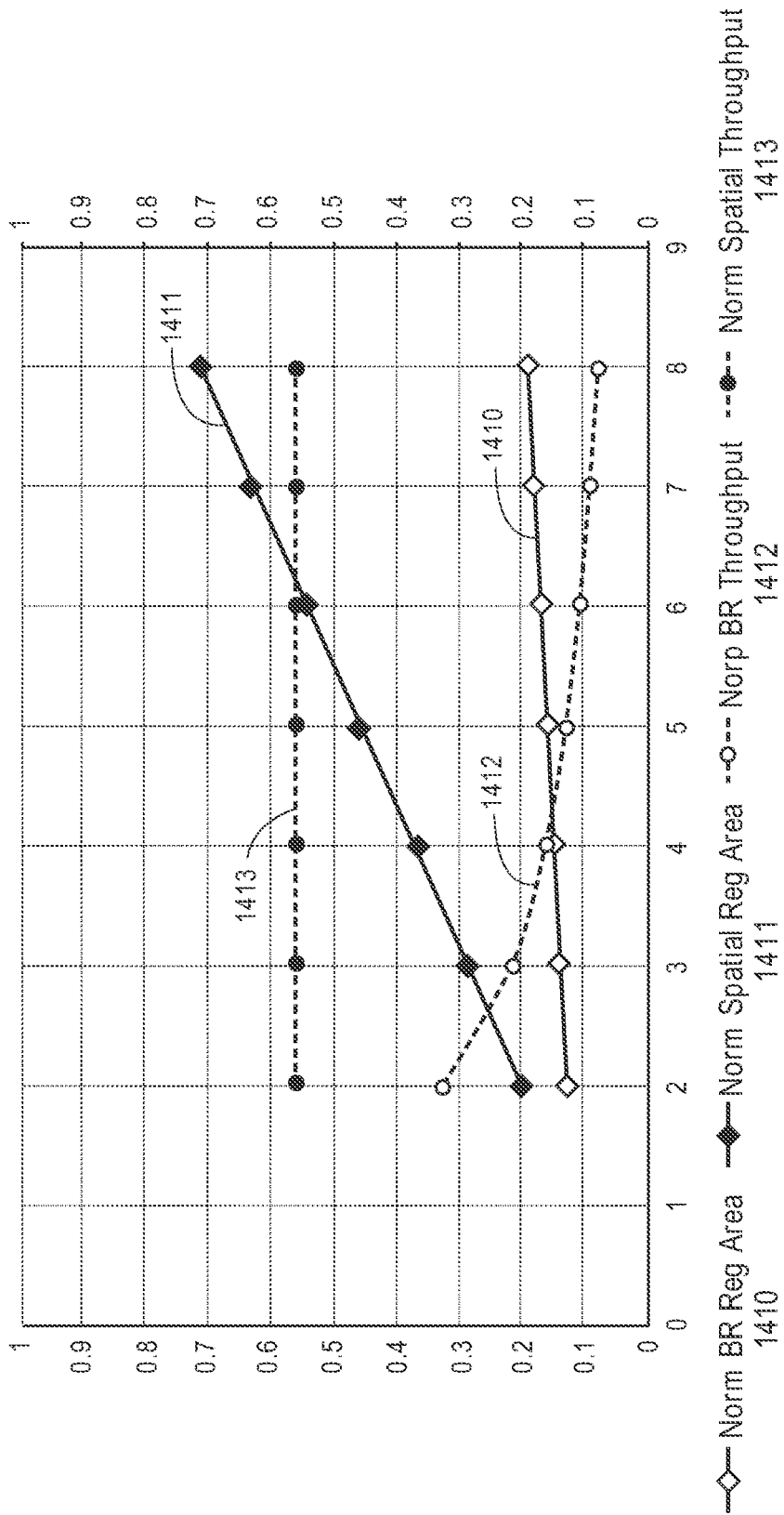
FIG. 14 illustrates a shared Norm-1 unit in accordance with one embodiment.
Figure 15:
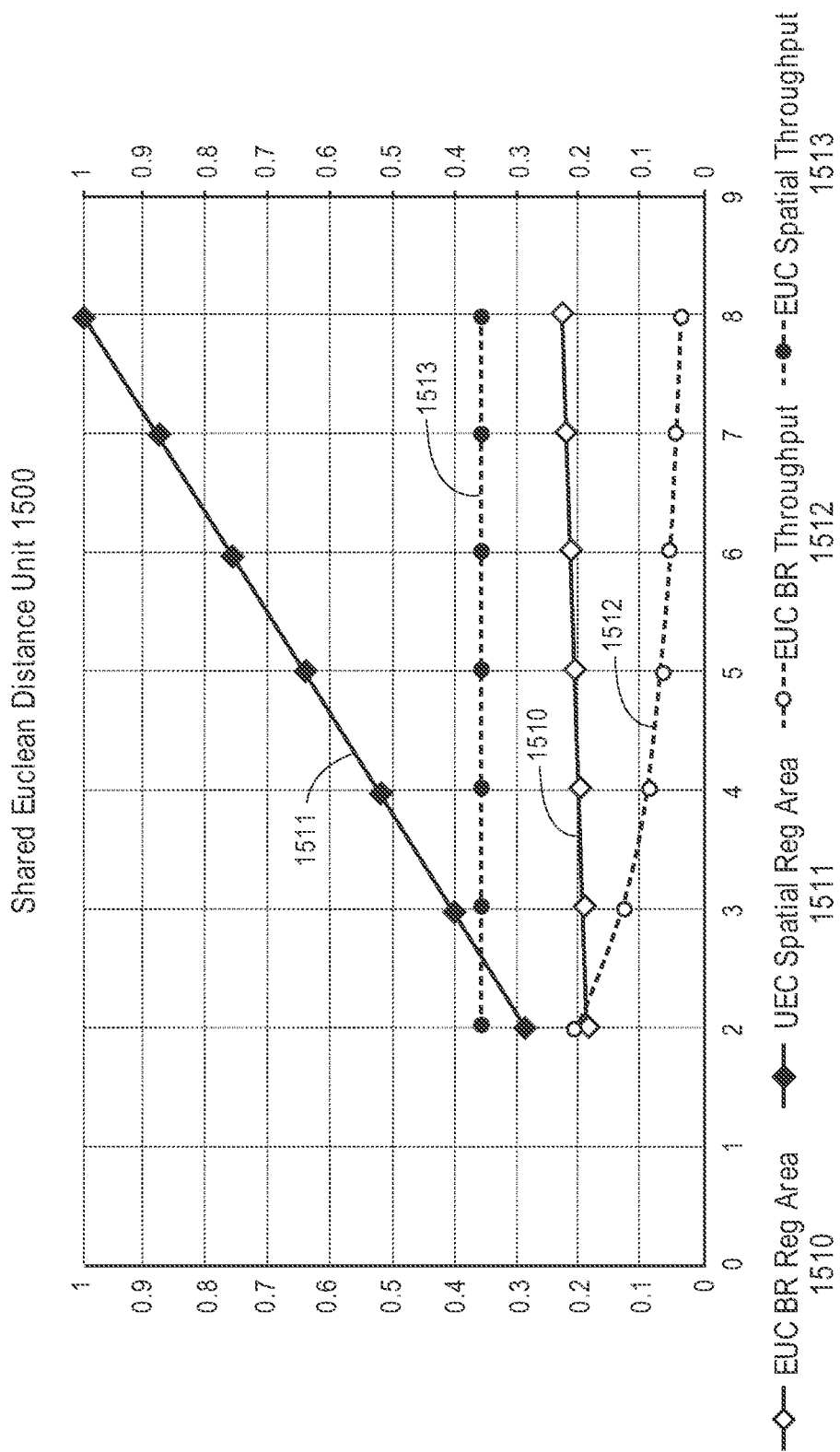
FIG. 15 illustrates a shared Euclidean distance unit in accordance with one embodiment.

The designs chosen for offload are a shared floating point add unit as illustrated in FIG. 13, a shared two dimensional Norm-1 distance computation unit as illustrated in FIG. 14, and a shared two dimensional Euclidean distance computation unit as illustrated in FIG. 15.

FIG. 13 illustrates a shared add unit in accordance with one embodiment. The shared add unit diagram 1300 illustrates normalized numbers for area throughput trade-offs including add BRAM (BR) Registers area 1310, add spatial registers area 1311, add BR throughput 1312, and add spatial throughput 1313.

FIG. 14 illustrates a shared Norm-1 unit in accordance with one embodiment. The shared Norm-1 unit diagram 1400 illustrates normalized numbers for area throughput trade-offs including norm BR Registers area 1410, norm spatial registers area 1411, norm BR throughput 1412, and norm spatial throughput 1413.

FIG. 15 illustrates a shared Euclidean distance unit in accordance with one embodiment. The shared Euclidean distance unit diagram 1500 illustrates normalized numbers for area throughput trade-offs including Euclidean distance BR Registers area 1510, Euclidean distance spatial registers area 1511, Euclidean distance BR throughput 1512, and Euclidean distance spatial throughput 1513.

TABLE I

Area-Throughput Tradeoffs for Synthetic Benchmarks

| Num Users | No share Registers | LUT | Throughput | BR Registers | LUT | Throughput |
|---|---|---|---|---|---|---|
| Euclidean Distance Unit |||||||
| 2 | 0.2590951062 | 0.3002077562 | 0.3694367177 | 0.1673361034 | 0.2021006464 | 0.2023809524 |
| 3 | 0.3618651893 | 0.4144044321 | 0.3694367177 | 0.1766851339 | 0.2180055402 | 0.1350063532 |
| 4 | 0.4646121884 | 0.5302631579 | 0.3694367177 | 0.1859418283 | 0.2292243767 | 0.1011904762 |
| 5 | 0.5673822715 | 0.6495844875 | 0.3694367177 | 0.1952908587 | 0.2590027701 | 0.0809832317 |
| 6 | 0.6701292705 | 0.7603647276 | 0.3694367177 | 0.2045475531 | 0.258933518 | 0.0674603175 |
| 7 | 0.7728762696 | 0.8779778393 | 0.3694367177 | 0.2138042475 | 0.2862419206 | 0.0578388677 |
| 8 | 0.8756232687 | 1 | 0.3694367177 | 0.2230609418 | 0.2952216066 | 0.0505952381 |
| Norm-1 Distance Unit |||||||
| 2 | 0.1793167128 | 0.2123377101 | 0.5666666667 | 0.115143121 | 0.1391735919 | 0.3269230769 |
| 3 | 0.254478301 | 0.301800554 | 0.5666666667 | 0.1244921514 | 0.1549861496 | 0.2181724846 |
| 4 | 0.3296168052 | 0.392867036 | 0.5666666667 | 0.1337488458 | 0.1662280702 | 0.1634615385 |
| 5 | 0.4047783934 | 0.4873037858 | 0.5666666667 | 0.1430978763 | 0.1960064635 | 0.1308497537 |
| 6 | 0.4799168975 | 0.5732686981 | 0.5666666667 | 0.1523545706 | 0.1957987073 | 0.108974359 |

TABLE I-continued

Area-Throughput Tradeoffs for Synthetic Benchmarks

| Num Users | No share Registers | LUT | Throughput | BR Registers | LUT | Throughput |
|---|---|---|---|---|---|---|
| 7 | 0.5550554017 | 0.6677516159 | 0.5666666667 | 0.161611265 | 0.2232686981 | 0.0934476693 |
| 8 | 0.6301939058 | 0.7634579871 | 0.5666666667 | 0.1708679594 | 0.2322714681 | 0.0817307692 |
| Add Unit | | | | | | |
| 2 | 0.0750692521 | 0.0922206833 | 1 | 0.0541320406 | 0.0671514312 | 0.6538461538 |
| 3 | 0.1040166205 | 0.1271698984 | 1 | 0.0605263158 | 0.0770083102 | 0.4372427984 |
| 4 | 0.1329409049 | 0.1639427516 | 1 | 0.0668282548 | 0.0853416436 | 0.3269230769 |
| 5 | 0.1618882733 | 0.2009926131 | 1 | 0.07322253 | 0.1003231764 | 0.2616995074 |
| 6 | 0.1908125577 | 0.2358956602 | 1 | 0.0795244691 | 0.108910434 | 0.2181724846 |
| 7 | 0.2197368421 | 0.2760387812 | 1 | 0.0838264081 | 0.1216528163 | 0.1870598592 |
| 8 | 0.2486611265 | 0.3174746076 | 1 | 0.0921283472 | 0.1304478301 | 0.1634615385 |

Table I shows normalized numbers for area throughput trade-offs. From this, the design size grows large, shared offloads becomes the natural choice. A linear model can predict which choice is better under given set of area, throughput, DSP constraints. A compiler of the present design can perform this design space exploration for user and make the right choice, under given set of constraints A generic methodology for resource sharing with the help of composition compiler is presented herein. A compiler can securely interconnect designs irrespective of interface type, while also automatically making smart choices about isolation techniques.

Alternate methods of implementing a similar design include using a high level synthesis tool instead of a compiler tool. Also, the bandwidth reservation mechanism can be implemented on communications between different substrates including DSPs, FPGAs, and ASIC and for different application specific designs.

A method of the present design is automated since it is compiler-based and makes the security oblivious to the user. It supports any generic accelerator designed using our environment. Also, this method automatically finds the least expensive way to block the timing channels when choosing between isolation and bandwidth reservation for sub-modules in the design.

The present design can be implemented with a variety of big-data/machine-learning FPGA accelerators. This technology shares the resources of FPGAs between multiple applications without having any timing channel. The present design removes all timing channels that potentially may form through any shared resource. The present design removes all timing channels automatically for applications and user does not need to pay attention to the details. The present design provides automatic timing channel deterring. Unlike other compilers, a compiler of the present design is based on specific execution model that allows detecting all shared resources in the pre-defined design patterns and that is the fundamental requirement to detect, and deter the timing channels.

Figure 17:
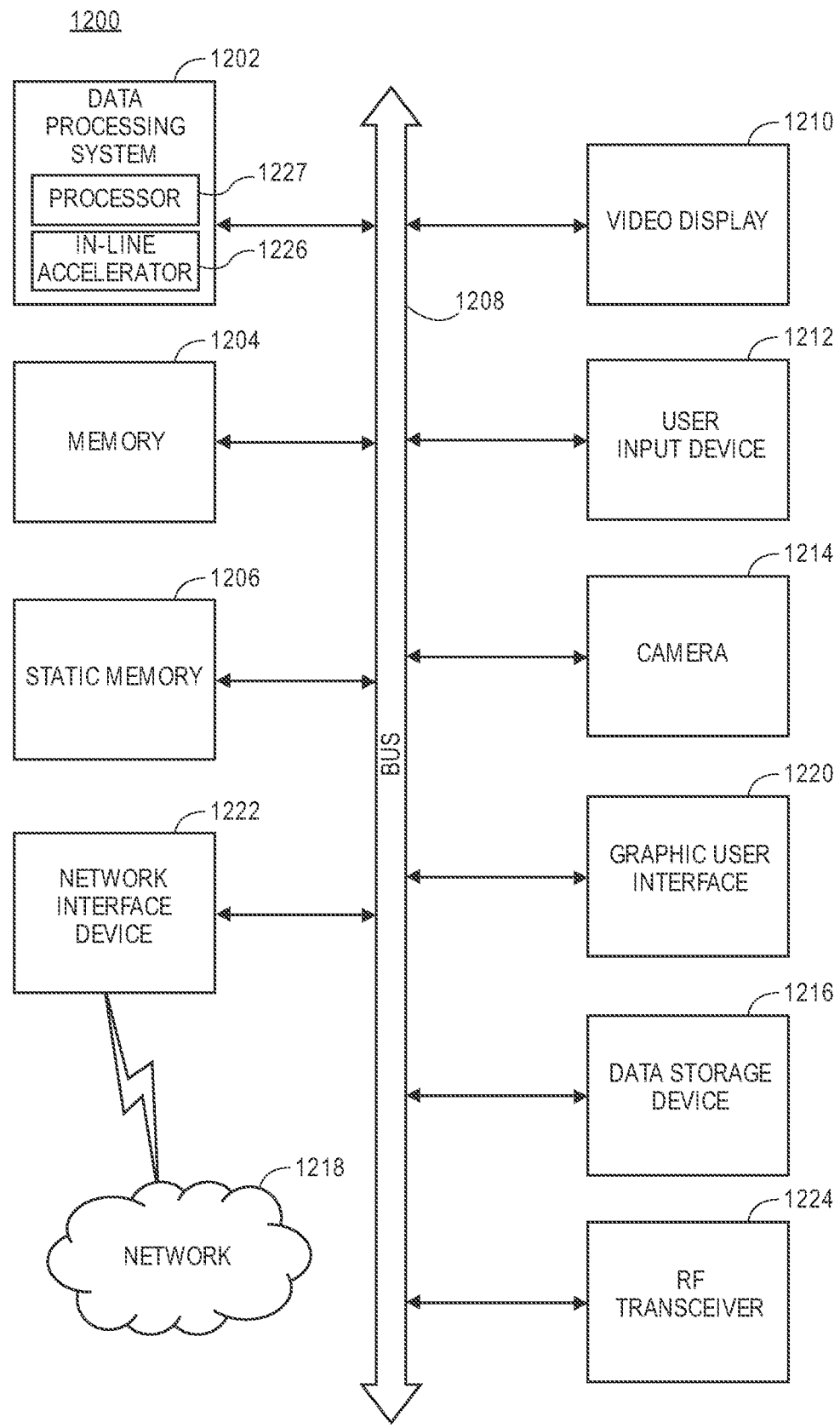
FIG. 17 is a diagram of a computer system including a data processing system according to an embodiment.

FIG. 17 is a diagram of a computer system including a data processing system according to an embodiment of the invention. Within the computer system 1200 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Data processing system 1202, as disclosed above, includes a processor 1227 and an in-line accelerator 1226. The processor may be one or more processors or processing devices (e.g., microprocessor, central processing unit, or the like). More particularly, data processing system 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The in-line accelerator may be one or more special-purpose processing devices such as an application specific integrated circuit (ASIC), a field programmable gate array (FPGA), a digital signal processor (DSP), network processor, many lightweight cores (MLWC) or the like. Data processing system 1202 is configured to implement the data processing system for performing the operations and steps discussed herein. A compiler for performing operations of the present disclosure (e.g., operations for automatically removing all timing channels that potentially form through any shared resources of design modules) can be located in the data processing system, processor, in-line accelerator, memory, data storage device, or at a different network location.

The exemplary computer system 1200 includes a data processing system 1202, a main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable computer-readable storage medium), which communicate with each other via a bus 1208. The storage units disclosed in computer system 1200 may be configured to implement the data storing mechanisms for performing the operations and steps discussed herein.

The computer system 1200 may further include a network interface device 1222. In an alternative embodiment, the data processing system disclose is integrated into the network interface device 1222 as disclosed herein. The computer system 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse), a camera 1214, and a Graphic User Interface (GUI) device 1220 (e.g., a touch-screen with input & output functionality).

The computer system 1200 may further include a RF transceiver 1224 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The Data Storage Device 1216 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the main memory 1204 and/or within the data processing system 1202 by the computer system 1200, the main memory 1204 and the data processing system 1202 also constituting machine-readable storage media.

The computer-readable storage medium 1224 may also be used to one or more sets of instructions embodying any one or more of the methodologies or functions described herein. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Figure 18:
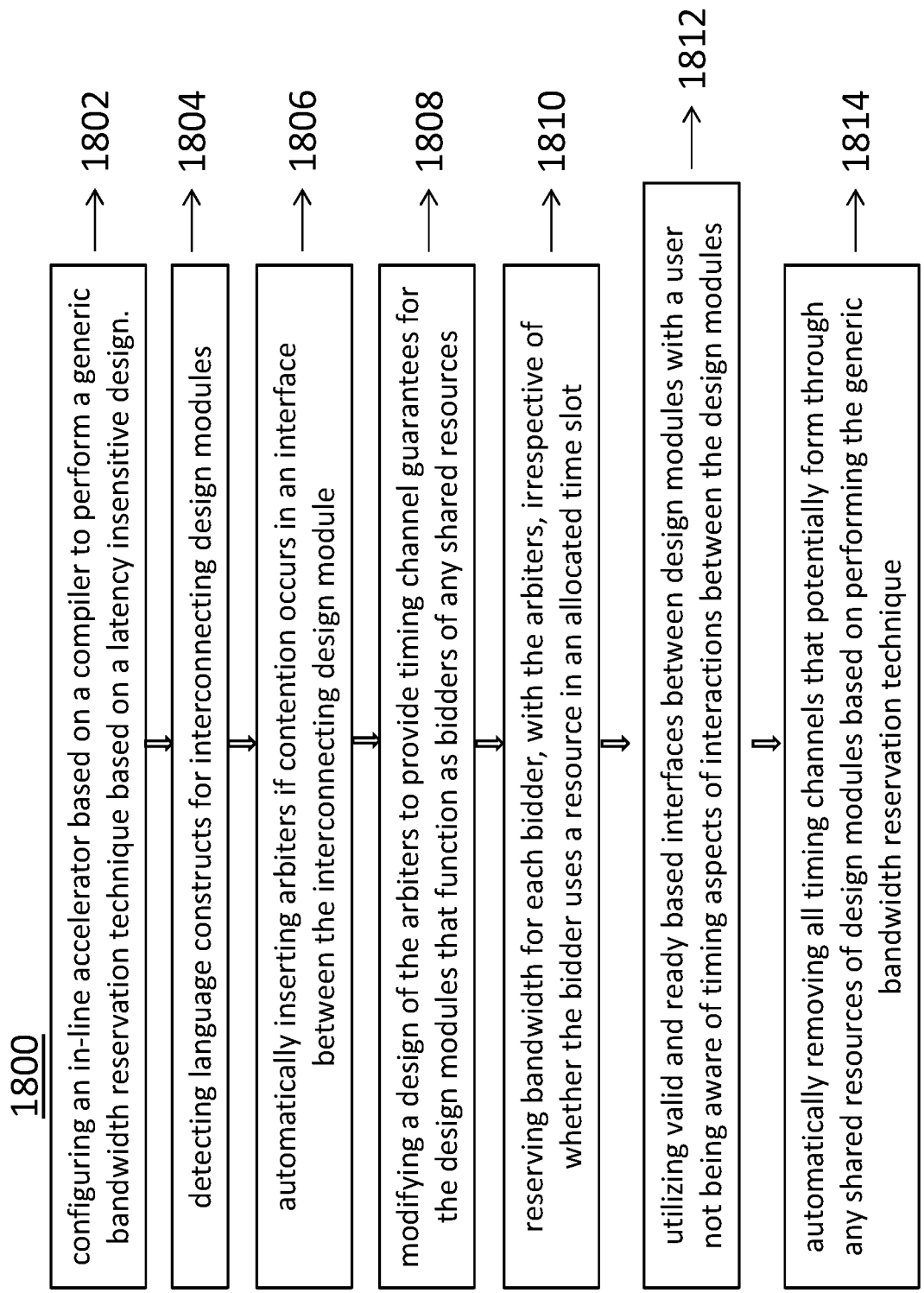
FIG. 18 is a flow diagram illustrating a method 1800 for automatically removing all timing channels that potentially form through any shared resources of design modules according to an embodiment.

FIG. 18 is a flow diagram illustrating a method 1800 for automatically removing all timing channels that potentially form through any shared resources of design modules according to an embodiment of the disclosure. Although the operations in the method 1800 are shown in a particular order, the order of the actions can be modified. Thus, the illustrated embodiments can be performed in a different order, and some operations may be performed in parallel. Some of the operations listed in FIG. 18 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of method 1800 may be executed by a data processing system, a machine, a server, a web appliance, or any system, which includes an in-line accelerator and a compiler. The in-line accelerator may include hardware (circuitry, dedicated logic, etc.), software (such as is run on a general purpose computer system or a dedicated machine or a device), or a combination of both. In one embodiment, at least one of a compiler and an in-line accelerator performs the operations of method 1800.

At operation 1802, the method includes configuring an in-line accelerator based on a compiler to perform a generic bandwidth reservation technique based on a latency insensitive design. At operation 1804, the method includes detecting language constructs for interconnecting design modules. At operation 1806, the method includes automatically inserting arbiters if contention occurs in an interface between the interconnecting design modules. At operation 1808, the method includes modifying a design of the arbiters to provide timing channel guarantees for the design modules that function as bidders of any shared resources. At operation 1810, the method includes reserving bandwidth for each bidder, with the arbiters, irrespective of whether the bidder uses a resource in an allocated time slot. At operation 1812, the method includes utilizing valid and ready based interfaces between design modules with a user not being aware of timing aspects of interactions between the design modules. The compiler modifies an interface for each design module with thread id and user id signal to identify bidders and track interfaces in hardware. At operation 1814, the method includes automatically removing all timing channels that potentially form through any shared resources of design modules based on performing the generic bandwidth reservation technique. In one example, the design modules comprise at least one of design IP cores and hard coded units.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. A data processing system comprising:
 an Input/output (I/O) interface to receive incoming data; and
 an in-line hardware accelerator coupled to the I/O interface, the in-line hardware accelerator is configured to receive the incoming data from the I/O interface and to automatically remove all timing channels that form through any shared resources, wherein the in-line accelerator is further configured based on a compiler to perform a generic bandwidth reservation based on latency insensitive design for automatically removing all timing channels that form through any shared resource.

2. The data processing system of claim 1, wherein the generic bandwidth reservation utilizes valid and ready based interfaces between design modules with a user not being aware of timing aspects of interactions between the design modules.

3. The data processing system of claim 2, wherein the compiler detects language constructs for interconnecting design modules, automatically inserts arbiters if contention occurs in an interface between the interconnecting design modules, and modifies a design of the arbiters to provide timing channel guarantees for the design modules that function as bidders of any shared resources.

4. The data processing system of claim 3, wherein the compiler modifies an interface for each design module with thread id and user id signals to identify bidders and track interfaces in hardware.

5. The data processing system of claim 1, further comprising:
a general purpose instruction-based processor coupled to the I/O interface, wherein the in-line accelerator is configured to automatically remove all timing channels that form through any shared resources without utilizing the general purpose instruction-based processor.

6. The data processing system of claim 1, wherein the in-line accelerator is implemented on a Field Programmable Gate Array (FPGA), a many-core, a graphical processing unit (GPU), or an application specific integrated circuit (ASIC).

7. A computer-implemented method comprising:
configuring an in-line accelerator based on a compiler to perform a generic bandwidth reservation technique based on a latency insensitive design; and
automatically removing all timing channels that form through any shared resources of design modules based on performing the generic bandwidth reservation technique that is based on the latency insensitive design.

8. The computer-implemented method of claim 7, further comprising:
detecting language constructs for interconnecting design modules; and
automatically inserting arbiters if contention occurs in an interface between the interconnecting design modules.

9. The computer-implemented method of claim 8, further comprising:
modifying a design of the arbiters to provide timing channel guarantees for the design modules that function as bidders of any shared resources.

10. The computer-implemented method of claim 9, further comprising:
reserving bandwidth for each bidder, with the arbiters, irrespective of whether the bidder uses a resource in an allocated time slot.

11. The computer-implemented method of claim 10, further comprising:
utilizing valid and ready based interfaces between design modules with a user not being aware of timing aspects of interactions between the design modules.

12. The computer-implemented method of claim 11, wherein the design modules comprise at least one of design IP cores and hard coded units.

13. The computer-implemented method of claim 11, wherein the compiler modifies an interface for each design module with thread id and user id signal to identify bidders and track interfaces in hardware.

\* \* \* \* \*